Mar. 27, 1923.
N. C. WOODIN.
REVERSIBLE DRIVE MECHANISM FOR HOIST DRUMS AND THE LIKE.
FILED APR. 26, 1920.
1,449,717.
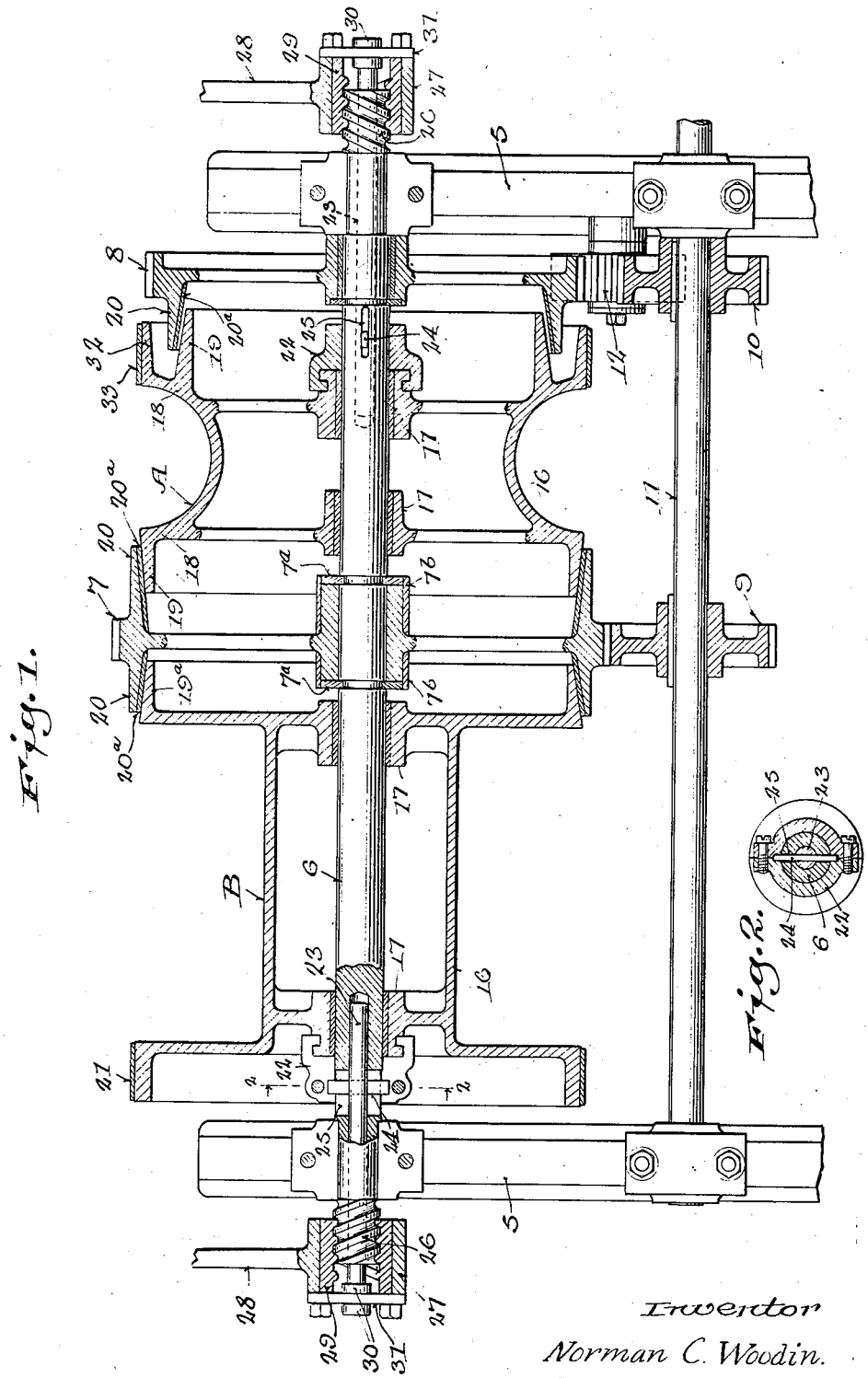
Inventor
Norman C. Woodin.
By Frank L. Ratcliffe
Attorney.

Patented Mar. 27, 1923.

1,449,717

UNITED STATES PATENT OFFICE.

NORMAN C. WOODIN, OF MILWAUKEE, WISCONSIN.

REVERSIBLE DRIVE MECHANISM FOR HOIST DRUMS AND THE LIKE.

Application filed April 26, 1920. Serial No. 376,648.

*To all whom it may concern:*

Be it known that I, NORMAN C. WOODIN, a citizen of the United States, and resident of Milwaukee, in the county of Milwaukee and State of Wisconsin, have invented certain new and useful Improvements in Reversible Drive Mechanisms for Hoist Drums and the like; and I do hereby declare that the following is a full, clear, and exact description thereof.

The present invention relates to new and useful improvements in clutch transmission mechanisms and is more particularly directed to the provision of a reversible drive means for drums such as are used in that simpler type of elevator structure commonly used in building constructions and other temporary connections, although the invention is applicable to various types of clutch drive mechanisms.

It is in general the object of my invention to simplify and otherwise improve the structure and to increase the efficiency of mechanisms of this character, particularly with respect to the provision of an improved bearing connection for the clutch control member to distribute the frictional action incidental to application of the clutch. A further object resides in the provision of an exceedingly compact arrangement for independently imparting selective rotary movement to a pair of drums or similar driven members. A still further object resides in the provision of means for imparting independent reversible rotary movement to a pair of drums mounted on a stationary shaft.

With the above and other objects and advantages in view, the invention resides more particularly in the novel combination, arrangement and formation of parts hereinafter described and particularly pointed out in the appended claims.

In the drawings:
Figure 1 is a vertical sectional view through a reversible drum drive mechanism embodying a preferred form of the present invention.

Figure 2 is a transverse detailed sectional view taken on the line 2—2 of Figure 1 and showing the drum shifting means.

Referring now more particularly to the accompanying drawings, the present embodiment of the invention comprises a pair of main support members constituted of a pair of frame sills 5, and to these sills is rigidly secured the ends of a stationary drum shaft 6. An intermediate gear wheel 7, and an end gear wheel 8 are loosely mounted on this shaft and are held in a suitable manner against lateral movement, the holding means of the intermediate gear wheel comprising split collar sections 7ª engaging the ends of the wheel hub and set in grooves in the stationary shaft, these collar sections being retained in place by sleeves 7ᵇ fitted thereover and over the ends of the hub. Said gears are rotated in opposite directions by gears 9 and 10 carried on a countershaft 11, journaled on the sills 5, the gear 9 meshing directly with the intermediate gear 7 while the gear 10 meshes with an idler gear 12, which in turn meshes with the gear 8. A pair of drums A and B are rotatable and shiftably mounted on the shaft 6 at the sides of the intermediate gear wheel, and each drum comprises an annular body portion 16 having hubs 17 at its ends which are slidably journaled on the shaft. The drum A also includes annular end flanges 18, which have their peripheral portions extended outwardly to form clutch cones 19 which are engageable in co-acting cone clutch portions 20 carried by the peripheral portions of the gears, and the drum B is provided at its inner side with a clutch cone extension 19ª co-acting with a portion 20. The intermediate gear wheel 7 is thus provided with a pair of clutch portions extending from its sides. By thus providing for clutch engagement at the peripheries of the drum flanges, an exceedingly large clutch surface is provided for whereby an efficient clutch operation is procured, a suitable frictional facing 20ª being carried by either of the cone portions 19 or 20.

Thus upon shifting the drum A longitudinally on the shaft it will be clutched with either of the gears to rotate in either direction, while the drum B may be rotated in one direction by the clutch engagement with the intermediate gear. This drum B is intended to carry the derrick cable, and thus the movement of the drum in the other direction is effected by the gravity load of the derrick. The outer side of the drum B carries a brake 21 for controlling this movement. The drum A is adapted to carry a plurality of windings of an elevator cable, and thus gear driven rotation of said drum A in either direction will raise or lower the elevator.

The means for shifting each drum includes a split collar 22 which is rotatably slidable on one end of the shaft between the respective drum hub and gear and which has interlocking rotatable connection with said hub. The adjacent end of the shaft is longitudinally bored and slidable in this bore is a clutch rod 23 through which is transversely passed a key bar 24 which slidably projects through slots 25 formed in the shaft adjacent the collar and which has its ends engaged in the collar so that reciprocation of the collar will reciprocate the drum without interfering with its rotative movement. A bearing surface of relatively large area is thus provided between the rotating drum and the shifting means for the drum, which receives the thrust component of force exerted in holding the clutch faces in proper driving engagement, and thus an undue heating action is avoided by the provision of such large bearing surface, it being noted that in other types of shifting mechanism for this general purpose and embodying a relatively small bearing surface to receive the thrust, that an excessive heat has been generated, causing failure of the mechanism.

To provide lever means for reciprocating the clutch rods 23, the ends of the drum shaft 6 are extended outwardly of the frame sills 5 and provided in each extended portion with screw threads 26 of relatively great pitch and threaded on this extended end of the shaft is a sleeve 27 carrying the operating lever 28, this sleeve including an inner bushing portion 29 and the rod being connected with the sleeve by heads 30 on its outer end engaged with an end plate 31 carried by the sleeve.

The shaft 6, being rigidly secured to the sills 5, forms an exceedingly strong structure, and the particular arrangement of the drum shifting means, conduces further to the provision of a structure which is exceedingly compact, and wherein the strains incident to operation are properly distributed.

The gear 8 being, as shown, smaller than the gear 7 to provide for the positioning of the idler gear 12, the clutch cone 19 of the adjacent flange of the drum A is consequently disposed inwardly with respect to the clutch cones of the other flanges, and the drum flange adjacent the gear 8 is therefore extended outwardly past its clutch cone portion and the free end of said outwardly projected portion is directed toward the gear at 32 to provide a brake surface co-operating with a brake band 33 for holding the elevator stationary when the elevator drum A is in neutral position. The clutch shaft levers 28 and the brakes 21 and 33 may be controlled by any suitable lever means (not shown) from a single point of control.

It is noted that the key members stop short of engagement with the adjacent end of the main shaft slots 25, in the normal limits of movement of the drums, and consequently a means is provided to compensate for wear of the clutch faces of the mechanism in as much as a slight additional throw of the lever provides for additional movement of the drum to compensate for such wear.

While I have shown a preferred embodiment of my invention, it will be appreciated that various changes and modifications of structure and arrangement may be employed without departing in any manner from the spirit of my invention as defined by the appended claims.

I claim:

1. In a power transmission, a shaft, an intermediate gear and an end gear loosely mounted on the shaft, a clutch portion carried by the inner side of the end gear and by each side of the intermediate gear, a drum mounted on the shaft between the gears, a second drum mounted on the shaft to the side of the intermediate gear opposite the first named drum, coacting clutch portions carried by said drums and coacting with the gear carrier clutch portions, and means for shifting the drums to selectively engage the clutch portion.

2. In a power transmission, a stationary shaft, an intermediate gear loosely mounted on the shaft, said shaft being provided with grooves at the sides of the gear, holding collar sections fitted in said grooves, retaining sleeves fitted over said sections and the adjacent hub portions of the gear wheel, members rotatable at the sides of the gear wheel, co-acting clutch portions carried by said members and gear wheel, and means for shifting said members to engage and disengage said clutch portions.

3. In a power transmission, a stationary shaft, a pair of drums rotatably mounted on the shaft, a gear loosely mounted on the shaft between the drums, co-acting clutch portions carried by the gear and drums, a second gear loosely mounted on the shaft on the outer side of one of the drums, coacting clutch portions carried by the second gear and the specified drum, means for driving the gears in opposite directions, brake means for the drums, and means for independently shifting the drums to procure selective engagement of the clutch portions thereof.

4. In a power transmission, a stationary shaft, gears rotatably secured on the shaft, clutch surfaces carried by the gears, a drum slidably rotatable on the shaft between the gears, two concentric flanges on one end of said drum and a single flange on the other end thereof, means for sliding said drum, clutch means carried by the inner peripheral portions of one of the two concentric drum flanges and the flange at the other end of the drum to engage the gear clutch surfaces, and brake means engageable with the other of said concentric drum flanges.

In testimony that I claim the foregoing I have hereunto set my hand at Milwaukee, in the county of Milwaukee and State of Wisconsin.

NORMAN C. WOODIN.